US011151619B2

(12) United States Patent
Zhou et al.

(10) Patent No.: US 11,151,619 B2
(45) Date of Patent: Oct. 19, 2021

(54) METHOD AND SYSTEM FOR INFORMATION PROCESSING

(71) Applicant: ADVANCED NEW TECHNOLOGIES CO., LTD., Grand Cayman (KY)

(72) Inventors: Le Zhou, Hangzhou (CN); Huanmi Yin, Hangzhou (CN); Li Chen, Hangzhou (CN); Jun Wu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/172,569

(22) Filed: Feb. 10, 2021

(65) Prior Publication Data
US 2021/0174409 A1   Jun. 10, 2021

Related U.S. Application Data

(63) Continuation of application No. PCT/CN2019/111573, filed on Oct. 17, 2019.

(30) Foreign Application Priority Data

Nov. 30, 2018   (CN) .......................... 201811459613.6

(51) Int. Cl.
*G06F 17/00*   (2019.01)
*G06K 5/00*   (2006.01)
(Continued)

(52) U.S. Cl.
CPC ....... *G06Q 30/0283* (2013.01); *G06F 16/953* (2019.01); *G06K 7/10297* (2013.01); *G06K 19/06037* (2013.01); *G06Q 40/025* (2013.01)

(58) Field of Classification Search
USPC ................................ 235/375, 380, 383, 385
See application file for complete search history.

(56) References Cited

U.S. PATENT DOCUMENTS 7,272,570 B2   9/2007   Sadler
8,403,215 B2   3/2013   Aihara et al.
(Continued)

FOREIGN PATENT DOCUMENTS

CN   101661560 A   3/2010
CN   103955824 A   7/2014
(Continued)

OTHER PUBLICATIONS

Written Opinion and International Search Report for PCT Application No. PCT/CN2019/111573 dated Jan. 16, 2020.
(Continued)

*Primary Examiner* — Tuyen K Vo

(57) ABSTRACT

The specification describes methods and systems for processing information. An exemplary method includes reading, by a computing device through a near field communication (NFC) interface, an electronic tag to obtain product information stored in the electronic tag; storing, by the computing device, the product information in the computing device; generating, by the computing device, an order based on the stored product information; receiving, by the computing device, a settlement file after the order is paid, wherein the settlement file comprises a user identification (ID) and a user credit score corresponding to the user ID; and transmitting, by the computing device, the settlement file to a server for verification based on the user credit score.

17 Claims, 17 Drawing Sheets

(51) Int. Cl.
*G06K 15/00* (2006.01)
*G06Q 30/02* (2012.01)
*G06K 7/10* (2006.01)
*G06Q 40/02* (2012.01)
*G06K 19/06* (2006.01)
*G06F 16/953* (2019.01)

(56) References Cited

U.S. PATENT DOCUMENTS

| | | | |
|---|---|---|---|
| 8,473,363 | B1 | 6/2013 | Oakes, III |
| 8,577,729 | B2 | 11/2013 | Iizaka et al. |
| 8,929,812 | B2 | 1/2015 | Gree |
| 9,112,541 | B2 | 8/2015 | Hillan et al. |
| 9,231,662 | B2 | 1/2016 | Awad et al. |
| 9,536,236 | B2 | 1/2017 | Hay |
| 9,654,903 | B2 | 5/2017 | Pogorelik et al. |
| 9,715,672 | B2 | 7/2017 | Daily et al. |
| 9,799,023 | B2 | 10/2017 | Jacobs |
| 2007/0174198 | A1* | 7/2007 | Kasahara ............ H04L 63/0853 705/51 |
| 2008/0046570 | A1 | 2/2008 | Abel |
| 2008/0281726 | A1* | 11/2008 | Gupta ................. G06Q 40/00 705/26.1 |
| 2009/0055278 | A1* | 2/2009 | Nemani ................ G06Q 30/04 705/17 |
| 2010/0006646 | A1* | 1/2010 | Stiller ................ G06K 17/0022 235/383 |
| 2010/0161435 | A1* | 6/2010 | Shimizu .............. G06Q 20/203 705/22 |
| 2012/0157062 | A1* | 6/2012 | Kim ..................... H04M 15/06 455/414.1 |
| 2014/0027506 | A1 | 1/2014 | Heo et al. |
| 2014/0222603 | A1 | 8/2014 | Hay |
| 2015/0193763 | A1 | 7/2015 | Cyr et al. |
| 2015/0235197 | A1 | 8/2015 | Edwards |
| 2015/0262117 | A1* | 9/2015 | Li ........................ G06Q 10/087 235/385 |
| 2016/0071089 | A1 | 3/2016 | Boivie |
| 2016/0210603 | A1* | 7/2016 | Murphy ................ G06Q 20/29 |
| 2016/0364719 | A1 | 12/2016 | Jeon |
| 2020/0027087 | A1* | 1/2020 | Venkatasubramanian .................. G06Q 20/401 |

FOREIGN PATENT DOCUMENTS

| | | |
|---|---|---|
| CN | 106251134 A | 12/2016 |
| CN | 107909365 A | 4/2018 |
| CN | 109615038 A | 4/2019 |
| KR | 101614217 B1 | 4/2016 |
| TW | 201638843 A | 11/2016 |
| WO | 2008021032 A3 | 4/2008 |

OTHER PUBLICATIONS

Search Report for Taiwanese Application No. 108132563 dated Dec. 31, 2020.
International Preliminary Report on Patentability for PCT Application No. PCT/CN2019/111573 dated Jun. 10, 2021.
First Search for Chinese Application No. 201811459613.6 dated May 19, 2021.

* cited by examiner

METHOD AND SYSTEM FOR INFORMATION PROCESSING

CROSS-REFERENCE TO RELATED APPLICATIONS

The application is a continuation application of International Patent Application No. PCT/CN2019/111573, filed on Oct. 17, 2019, which claims priority to Chinese Patent Application No. 201811459613.6, filed on Nov. 30, 2018. The entire content of the above-referenced applications is incorporated herein by reference.

TECHNICAL FIELD

This application generally relates to an information processing method, and in particular, to transferring information by using NFC technology.

BACKGROUND

At present, in people's daily life, shopping in offline physical stores and supermarkets is still the main shopping method. Because of the advantages of being direct and fast, shopping in physical stores and supermarkets is generally favored by people. In a shopping process, a consumer mainly purchases needed products in a supermarket, and then, the consumer goes to a settlement channel for settlement. Each settlement channel is equipped with a checkout station, and one cashier is responsible for each checkout station. The cashier performs code scanning, settlement, and cashiering on the products purchased by the consumer.

During shopping in a physical supermarket, if there is a peak shopping period, a large number of people are in line in settlement channels, resulting in a long waiting time for consumers and bad user experience. In addition, performing settlement and cashiering through cashiers results in relatively high labor costs.

For self-service settlement, some solutions in existing technologies include:

I. Amazon Go™ provides a solution of recognizing specific products taken by a user by using cameras and various sensors on shelves, and completing deduction when the user leaves. However, in this solution, sensors are needed to be disposed of throughout a store, and a lot of renovations need to be made, resulting in high costs and a high promotion threshold.

II. Wal-Mart™ has launched a handheld device for automatic settlement. A user enters a supermarket and scans codes of purchased products with a handheld code scanner. When the user leaves, settlement can be completed with one click. However, a disadvantage is that code-scanning actions are performed by a user instead of a cashier. Since commercial deployment, commodity theft rate is found to be high.

III. In offline entities (for example, supermarkets), code scanning is performed on products for payment. A user finds a product to purchase, opens "Scan," finds a barcode area of the product, and scans a barcode. However, in this way, there are many steps to operate, and barcodes of some products are not easy to scan, thereby resulting in a degraded customer experience.

IV. In an RFID unmanned checkout counter solution, an unmanned checkout counter is disposed of at a checkout station. A user places products on a sunken RFID reading counter, and order details are displayed on a screen. The user selects a settlement method that may be a card-swiping payment or code-scanning payment. If the code-scanning payment is selected, the user uses the mobile phone to open Alipay, makes a payment code displayed, picks up a code scanner on the side to scan the code, and completes the payment. However, in a payment process, the user still needs to use a mobile phone or a credit card to complete a payment process, resulting in a queuing problem.

V. An RFID tag is used for product recognition, and biometric recognition is used for payment. For a commercial scenario, the RFID requires renovations in a supply chain, resulting in high costs. In addition, an accuracy rate has not reached a level of commercialization.

SUMMARY

To resolve the foregoing technical problems, this application provides a method for efficient self-checkout service with NFC-based information processing.

According to one aspect of the application, the method includes: reading, by a computing device through a near field communication (NFC) interface, an electronic tag to obtain product information stored in the electronic tag; storing, by the computing device, the product information in the computing device; generating, by the computing device, an order based on the stored product information; receiving, by the computing device, a settlement file after the order is paid, wherein the settlement file comprises a user identification (ID) and a user credit score corresponding to the user ID; and transmitting, by the computing device, the settlement file to a server for verification based on the user credit score.

In some embodiments, the method further includes: receiving, by the computing device, a verification response from the server that comprises an updated user credit score; and storing, by the computing device, the updated user credit score by replacing the user credit score.

In some embodiments, the product information comprises a product ID and a product price.

In some embodiments, the product information comprises a store ID of a store and a product ID of a product, and the method further includes: sending a query to the server, wherein the query comprises the store ID, the product ID, and a quantity of the product; and receiving a response from the server, wherein the response indicates whether the store has the quantity of the product in stock.

In some embodiments, transmitting the settlement file to the server for verification comprises: transmitting the settlement file through the NFC interface to an NFC transceiver for the NFC transceiver to transmit the settlement file to the server.

In some embodiments, transmitting the settlement file to the server for verification comprises: generating a QR code comprising information of the settlement file.

In some embodiments, the electronic tag further stores a tag ID corresponding to a location of the electronic tag in a store, and the method further includes: sending, by the computing device, a recommendation request comprising the user ID and the tag ID to the server; and receiving, by the computing device, information of one or more recommended products that are within a distance from the location of the electronic tag in the store.

According to another aspect of the application, a non-transitory computer-readable storage media is described. The non-transitory computer-readable storage media stores instructions executable by one or more processors. Execution of the instructions causes the one or more processors to perform operations comprising: reading, through a near field communication (NFC) interface, an electronic tag to obtain product information stored in the electronic tag; storing the product information; generating an order based on the stored product information; receiving a settlement file after the order is paid, wherein the settlement file comprises a user identification (ID) and a user credit score corresponding to the user ID; and transmitting the settlement file to a server for verification based on the user credit score.

According to yet another aspect of the application, a system comprising one or more processors and one or more non-transitory computer-readable memories is described. The non-transitory computer-readable memories is coupled to the one or more processors and configured with instructions executable by the one or more processors to cause the system to perform operations comprising: reading, through a near field communication (NFC) interface, an electronic tag to obtain product information stored in the electronic tag; storing the product information; generating an order based on the stored product information; receiving a settlement file after the order is paid, wherein the settlement file comprises a user identification (ID) and a user credit score corresponding to the user ID; and transmitting the settlement file to a server for verification based on the user credit score.

Compared with the existing technologies, the methods and systems described in this specification have at least the following advantages: 1. Costs are low, only an electronic tag needs to be placed near a product, costs of renovations for a merchant are low, and promotion is easy. 2. User operations are simple, and a product can be added to a shopping cart only by making a terminal come into contact with the electronic tag. Compared with the existing code-scanning shopping, operations are simplified, and user experience is improved.

DETAILED DESCRIPTION

To make the above objects, features, and advantages of this application more clearly understood, specific implementations of this application will be described in detail below with reference to the accompanying drawings.

Many specific details are set forth in the following description to facilitate a full understanding of this application, but this application may also be implemented in other manners different from those described herein and is therefore not limited by specific embodiments disclosed below.

Near field communication (NFC) is a short-range high-frequency wireless communication technology allowing non-contact point-to-point data transmission (generally within 10 cm) between electronic devices, and is mainly used for providing machine to machine (M2M) communication between smart cards and smart devices.

To implement an M2M service between terminals by using NFC, NFC modules need to be installed in the terminals, and related software needs to be configured. When NFC functions of the terminals are enabled, NFC detection areas of the two terminals are aligned with each other, and a distance between the two areas cannot be too far (generally within 10 cm). After the alignment, the NFC modules respectively recognize electronic tags of each other for pairing, and a connection is established for information transferring after the pairing succeeds.

NFC includes the following three working modes:

1. Active mode: In an active mode, an NFC device may be used as a card reader and emit a radio frequency field to identify and read/write information about another NFC device.

2. Passive mode: In a passive mode, an NFC device is simulated as a card, and only makes a passive response and has information written or read in a radio frequency field emitted by another device.

3. Bidirectional mode: In a bidirectional mode, both NFC terminals emit radio frequencies to establish point-to-point communication. In other words, both the NFC devices are in an active mode.

This application provides an electronic tag having an NFC function. A terminal having an NFC function may perform NFC communication with an electronic tag to obtain information, and then perform a transaction.

Figure 1:
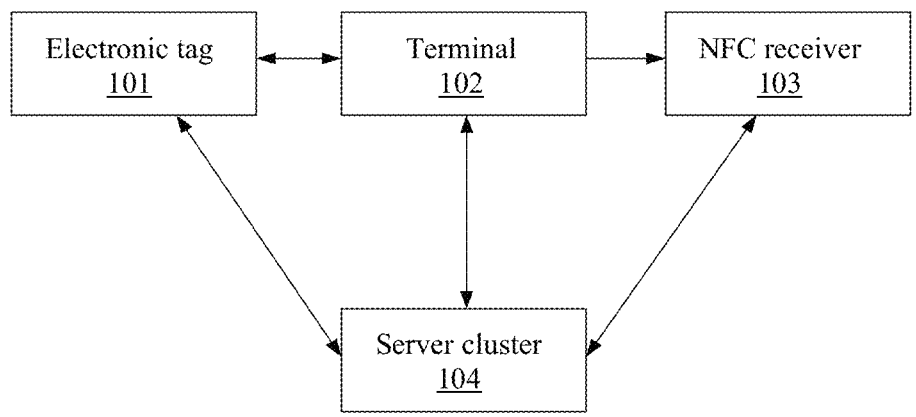
FIG. 1 is an architecture of a system according to various aspects of this application.

FIG. 1 is an architecture of a system according to various aspects of this application.

As shown in FIG. 1, the system may include an electronic tag 101, a terminal 102, an NFC receiver 103, and a server cluster 104.

The electronic tag 101 is disposed beside a corresponding product on a shelf, and each electronic tag may correspond to one product. Related information, such as store information, product information, tag information, and discount information, may be written into the electronic tag 101 in advance.

The store information may include a store ID (identifier) and a store payment-receiving account. The product information may include a product ID, a product name, a specification, a price, and the like. The tag information may include a tag ID and a tag position, where the tag position may be a specific position of the tag in the store, for example, a specific row and a specific column of a specific shelf. The discount information may include information about a combination of discounted products related to the product.

The electronic tag 101 may have an NFC function and may perform NFC communication with another device (for example, a terminal) in an active mode, a passive mode and/or a bidirectional mode. The electronic tag further has a wireless communication function, and may communicate with the server cluster 104.

The electronic tag 101 may further have a wireless communication capability, and can perform wireless communication with a remote server.

For example, the electronic tag 101 may be in a form of an LCD screen, a segment code electronic paper screen, a dot-matrix electronic paper screen, or the like.

In this specification, the electronic tag 101 may also be referred to as an electronic shelf tag or a tag.

The terminal 102 may be a mobile terminal (for example, a smartphone) having a wireless communication function and an NFC function. In this specification, the terminal may also be referred to as a mobile terminal, a smart terminal, a user terminal, a client, or the like.

The NFC receiver 103 may be placed near a checkout station, and has an NFC function and a wireless communication function. The NFC receiver 103 may read information in the terminal 102 through NFC communication. For example, when a user needs to leave a store after completing self-service settlement, a terminal may be approached to the NFC receiver 103, and settlement information of the user is sent to the NFC receiver 103. The NFC receiver 103 can send the read information to the server cluster 104 through a wireless network. Here, since the NFC receiver 103 is also capable of sending information to the server cluster 103, it may also be referred to as an NFC transceiver.

In some embodiment, the NFC receiver 103 may be a code scanner, and is described below in detail.

The server cluster 104 may include a store server, a payment server, a credit server, or any combination thereof. Details about various servers in the server cluster are described below.

Figure 2:
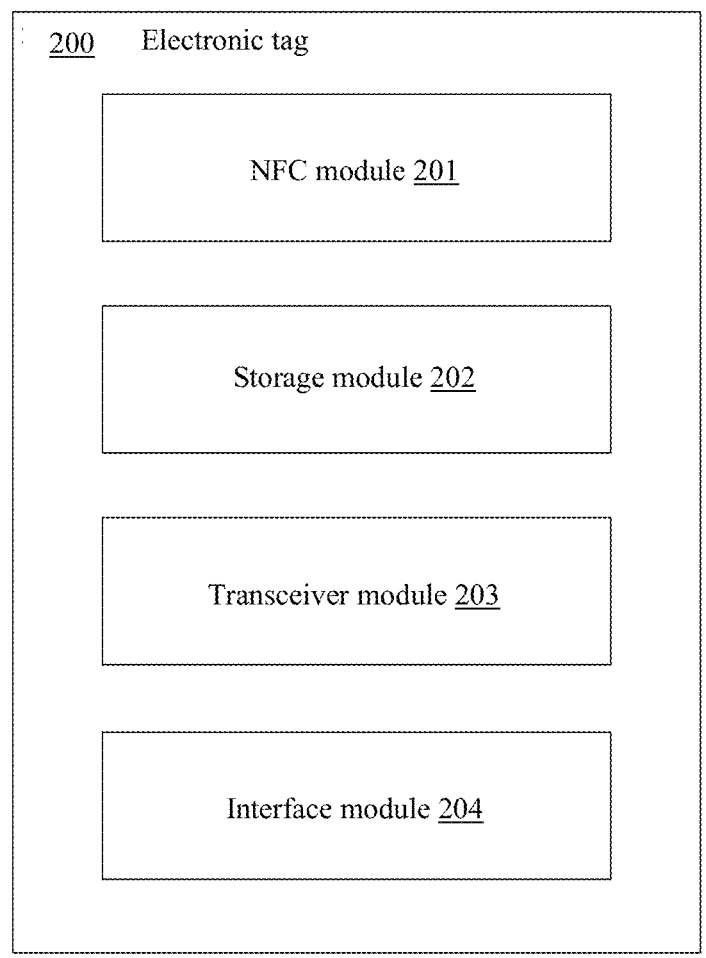
FIG. 2 is a composition block diagram of an electronic tag 200 according to various aspects of this application.

FIG. 2 is a composition block diagram of an electronic tag 200 according to various aspects of this application.

As shown in FIG. 2, an electronic tag 200 may include an NFC module 201, a storage module 202, a transceiver module 203, and an interface module 204.

The NFC module 201 may be configured to perform NFC communication with a device having an NFC function. For example, when a terminal having an NFC function approaches the electronic tag 200, the terminal may perform information transmission with the electronic tag 200 in an active mode, a passive mode and/or a bidirectional mode. The NFC module 201 may further be configured to write information. For example, the staff may write information to the electronic tag 200 through communication with the NFC module 201 by using the device having an NFC function.

The storage module 202 may store information of the store (for example, a store ID and a store payment-receiving account), product information (for example, a product ID, a product name, a specification, and a price), tag information (for example, a tag ID and a tag position), and discount information (for example, associated electronic tags in a combination of discounted products).

The transceiver module 203 may be configured to communicate with a server in a server cluster and/or other electronic tags through a wireless network, and for example, may query the server for product stock, receive product update information and/or credit update information from the server, send a user ID and an electronic tag ID to the server for recommendations, receive a control signal from the server or the terminal, and report a device failure to the server.

The interface module 204 may be configured to dock with another device, for example, dock with a mobile computing device for writing related information (for example, electronic tag information and product information).

Figure 3:
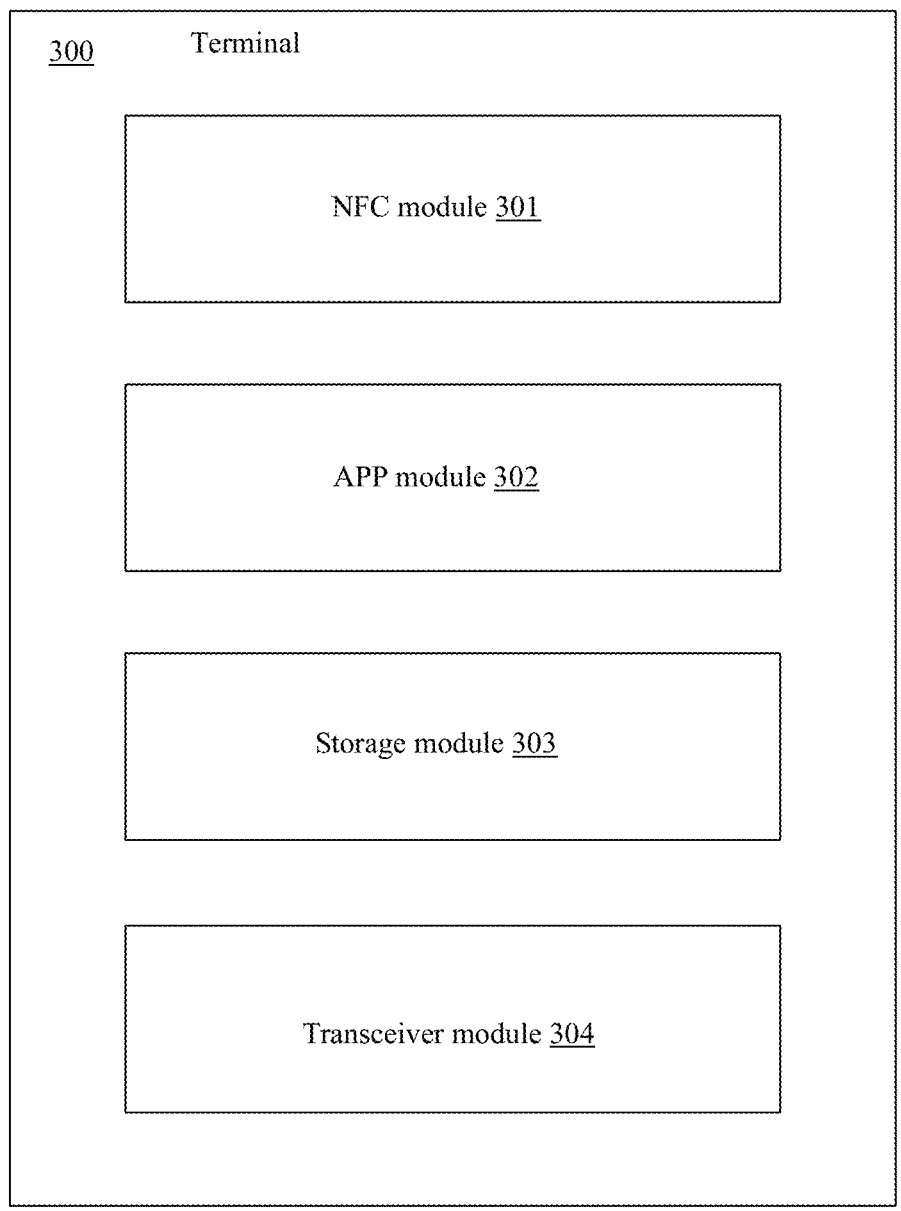
FIG. 3 is a composition block diagram of a terminal 300 according to various aspects of this application.

FIG. 3 is a composition block diagram of a terminal 300 according to various aspects of this application.

The terminal 300 may include an NFC module 301, an application (APP) module 302, a storage module 303, and a transceiver module 304.

The NFC module 301 is configured to perform NFC communication with an electronic tag and/or an NFC receiver.

According to an aspect, the NFC module 301 may read corresponding information in the electronic tag through NFC communication, and send the information to the APP module 302 for subsequent processing. The NFC module 301 may further send information (for example, a user ID) stored in the storage module to the electronic tag.

According to another aspect, the NFC module 301 may further send a verification request to the NFC receiver.

The APP module 302 may perform APP-related processing. For example, the APP module 302 may implement operations such as receiving product information from the NFC module 301 to add a product to a shopping cart, delete a product, or make a settlement.

The storage module 303 may store related information, for example, user information (a user ID), product information received from the electronic tag, store information, tag information, order information, user credit information, and recommendation information.

The transceiver module 304 may perform wireless communication with a server in a server cluster, for example, send a stock query request to the server, and receive credit update information and a recommendation message from the server.

Embodiments are described below in detail according to various aspects of this application.

Self-Service Order Generation

This specification provides a method for obtaining product information through a near field communication (NFC) technology for self-service order generation.

Figure 4:
FIG. 4 is a schematic diagram of obtaining product information through NFC according to various aspects of this application.

FIG. 4 is a schematic diagram of obtaining product information through NFC according to various aspects of this application.

As shown in FIG. 4, an electronic tag corresponding to a product is disposed on a product shelf. In this embodiment, store information and product information may be written into the electronic tag in advance. For example, when the electronic tag is disposed beside an associated product, the store information and the product information may be written in the electronic tag. When a product at a position of an electronic tag is replaced or an electronic tag is reset, product information can be updated in the electronic tag.

The electronic tag may interact with an NFC module of the terminal through an NFC mechanism, and may communicate with the server through a wireless network. The NFC module may be in a form of an NFC tag. For example, the NFC tag may be attached to the back of the electronic tag. FIG. 4 shows a scenario in which an NFC tag is attached to the back of an electronic tag. The NFC module may also be constructed in the electronic tag.

The store information may include a store ID and a store payment-receiving account. For example, when the user needs to purchase a large number of products or a product that the user wants to purchase is unavailable on the shelf, the user can send the store ID (for example, the store ID obtained from the electronic tag) and the product information (a product ID) to the server by using the terminal, to query the server for whether the store has sufficient stock. In response to the query, the server may return a feedback signal indicating whether there is sufficient stock to the terminal.

The product information may include a product ID, a product name, a specification, a product price, and the like.

Information in the electronic tag may be written and updated through NFC communication (for example, through a terminal having an NFC function), written and updated by a server through a wireless network, or written and updated by a device through an interface module.

When the terminal approaches the electronic tag, the information, for example, the store information and the product information, may be read from the electronic tag through NFC. When the terminal successfully reads related information, the terminal may issue a prompt signal, for example, a prompt tone (a "beep") or smartphone vibration, to prompt the user that the product has been successfully added to a shopping cart. In response to reading of the information, the terminal adds the product to a virtual shopping cart.

Figure 5:
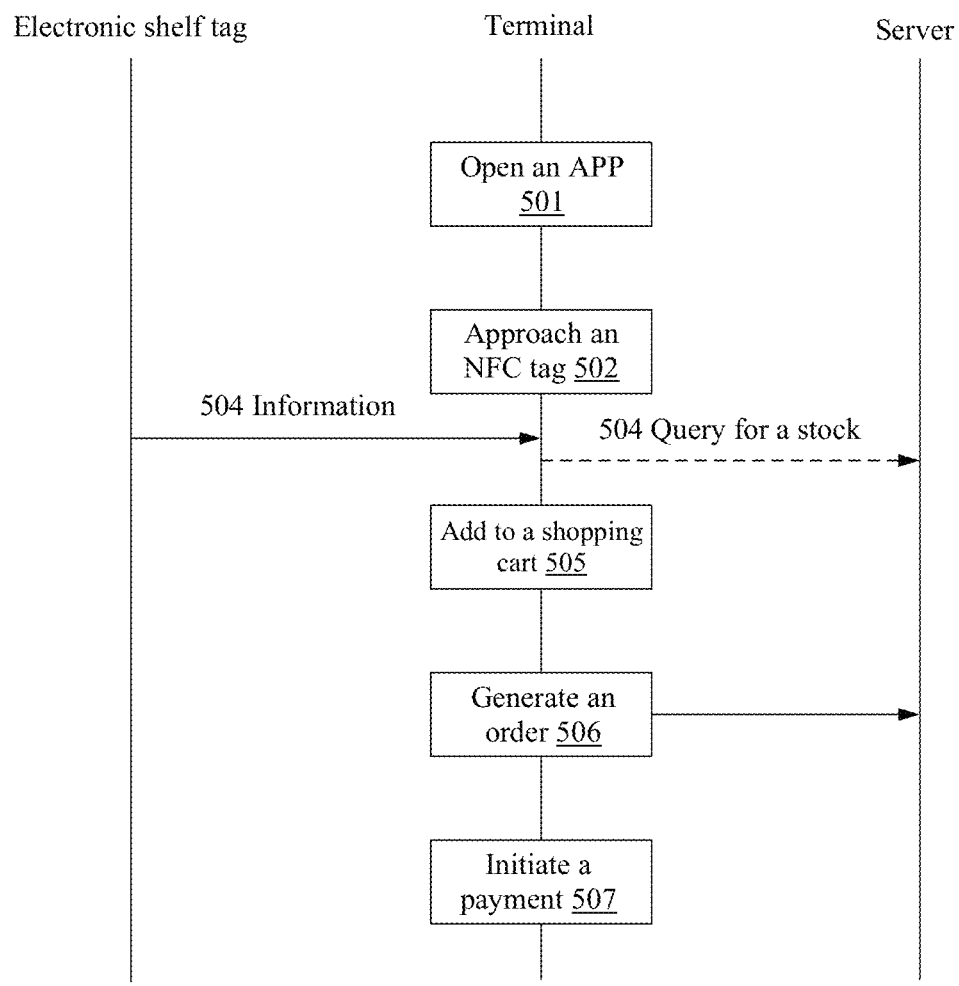
FIG. 5 is a message flow diagram of a method for self-service order generation by using NFC according to various aspects of this application.

FIG. 5 is a message flow diagram of a method for self-service order generation by using NFC according to various aspects of this specification.

At step 501, a user enters a store, opens a terminal application (APP), and enters an applet interface corresponding to the store. The applet may be entered by scanning a code or through a fixed entry in the main APP.

Figure 6:
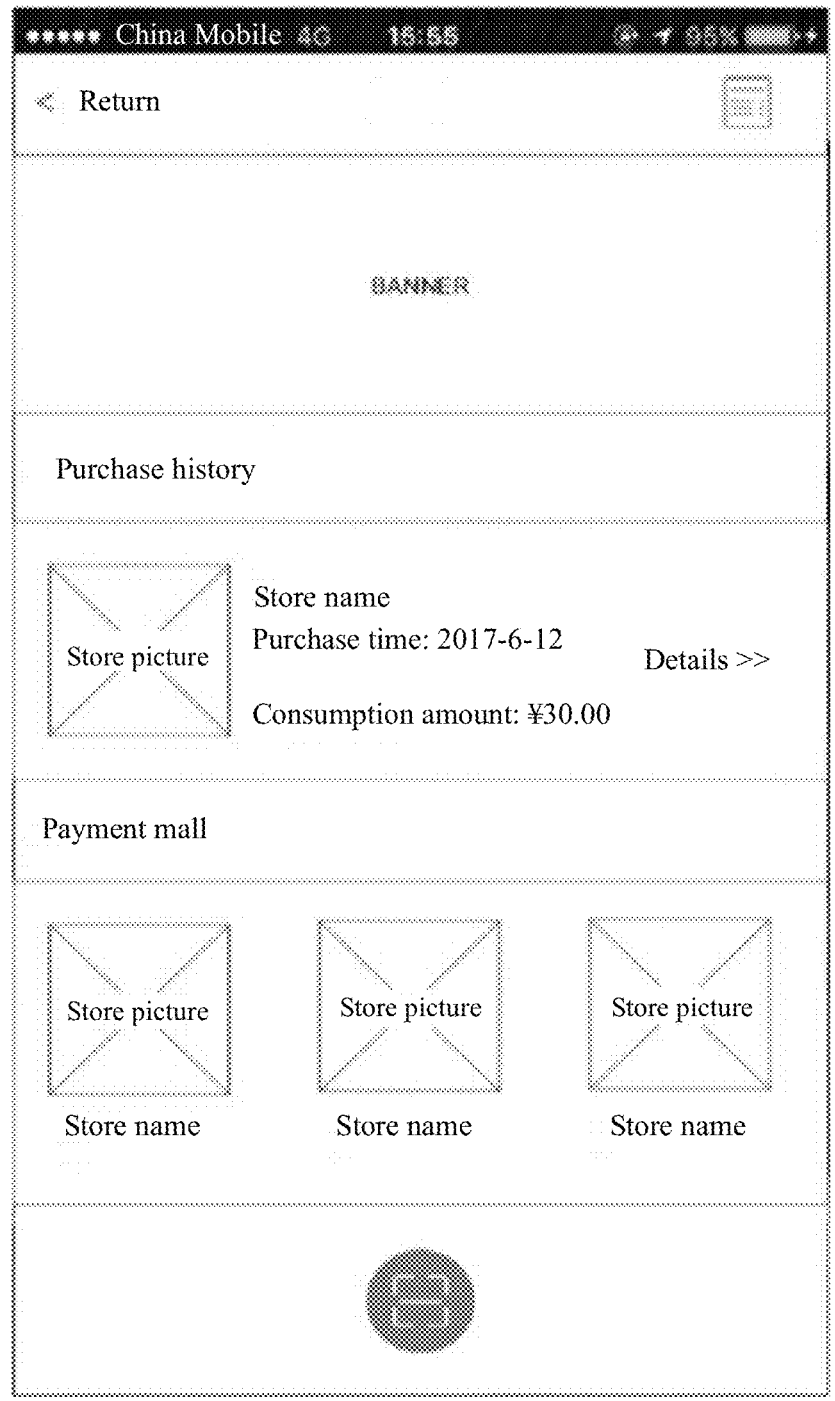
FIG. 6 shows an example of an interface for a user to enter a store applet.

FIG. 6 shows an example interface for a user to enter a store applet, in accordance with various embodiments.

At step 502, the user places the terminal towards an electronic tag of a product of interest.

At step 503, in response to the approaching of the terminal, the electronic tag sends related information (store information and product information) of the product stored on the electronic tag to the terminal through NFC communication. The electronic tag further sends a prompt signal to the terminal to prompt the user that the related information is successfully obtained/the product is successfully added to a shopping cart.

In some embodiments, at step 504, the terminal may query a server (for example, a store server or a cloud server). For example, when the user needs to purchase a large number of products or a product that the user wants to purchase is unavailable on the shelf, the user can send the store ID (for example, the store ID obtained from the electronic tag) and a product ID to the server by using the terminal, to query the server for whether the store has sufficient stock.

At step 505, in response to receiving the information from the electronic tag, the terminal adds a corresponding product to a virtual shopping cart.

At step 506, the terminal generates an order in the APP. For example, by repeating action of approaching the terminal to electronic tags, the user can add a plurality of the same or different products, or can enter a shopping cart page to manually perform number/addition/deletion editing in correspondence with taking a plurality of products or putting a product back, to generate an order finally.

At step 507, a payment is made on the terminal.

Figure 7:
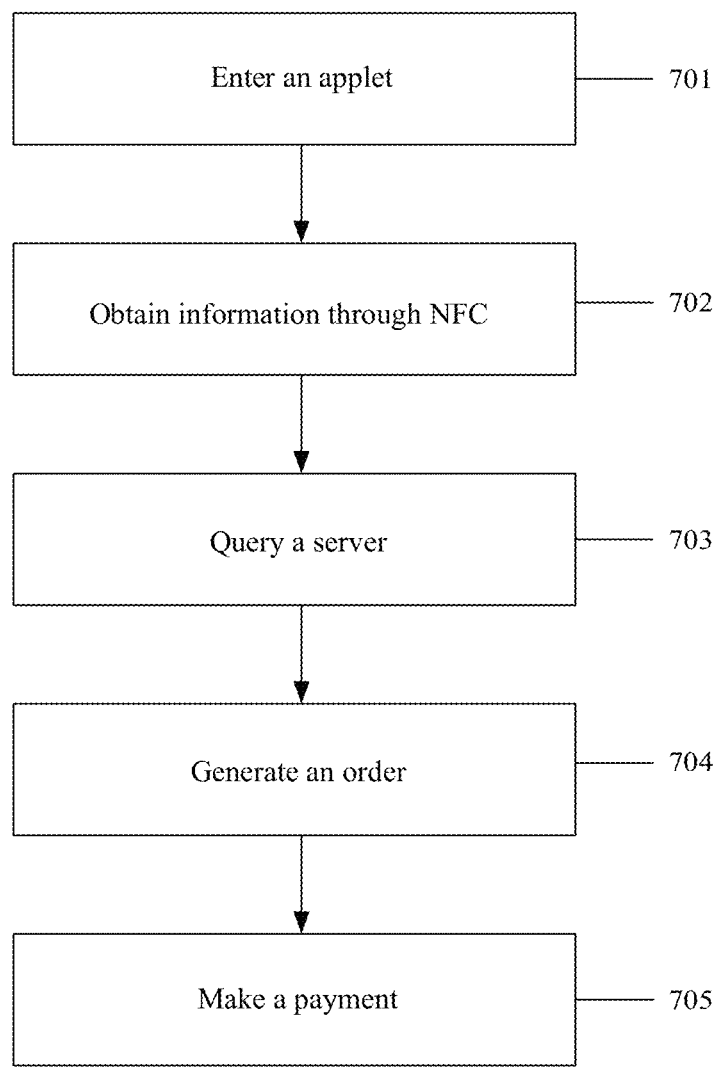
FIG. 7 is a flowchart of a method for self-service order generation performed by a terminal according to various aspects of this application.

FIG. 7 is a flowchart of a method for self-service order generation performed by a terminal according to various aspects of this application.

At step 701, a user enters a store, opens an application (APP) on a terminal (e.g., a terminal device), and enters an applet interface corresponding to the store. The applet may be entered by scanning a code or through a fixed entry in the main APP.

At step 702, the terminal is approached to an electronic tag of a product of interest, and related information (for example, store information and product information) of the product stored on the electronic tag is obtained through NFC.

At an optional step 703, the terminal may query a server (for example, a store server or a cloud server). For example, when the user needs to purchase a large number of products or a product that the user wants to purchase is unavailable on the shelf, the user may query the server on whether the store has sufficient stock.

At step 704, self-service order generation is performed in the APP. For example, by repeating action of approaching the terminal to electronic tags, a plurality of products can be added, or a shopping cart page can be entered to manually perform number/addition/deletion editing in correspondence with taking a plurality of products or putting a product back.

At step 705, the payment is made on the terminal. After the payment is completed, a settlement file is generated on the terminal, and the settlement file includes a user ID, a settlement amount, order details, a credit score of the user ID, and the like.

Compared with existing technologies, a self-service order generation solution provided by this specification has at least the following advantages:

1. Costs are low, only an electronic tag needs to be placed near a product, costs of renovations for a merchant are low, and promotion is easy.

2. User operations are simple, and a product can be added to a shopping cart only by making a terminal come into contact with the electronic tag. Compared with the existing code-scanning shopping, operations are simplified, and user experience is improved.

3. A user terminal may query a status (for example, a stock) of a product through an electronic tag, so that compared with querying for stock in the past, efficiency is improved.

Credit-Based Verification

This specification further provides a credit-based verification method. In the existing code-scanning payment solution in a physical store, after a user completes code scanning, a cashier often needs to manually verify the transaction, which is expensive, slow, and error-prone. As a result, the physical store still faces problems of high labor costs, and long waiting queues. If no verification is performed, a problem of a relatively high theft rate may occur.

In the credit-based verification method provided by this specification, different verification policies are adopted for users based on credit scores of the users. Further, the NFC receiver may receive a verification request from a user through NFC communication, thereby simplifying user operations and improving verification efficiency.

According to an aspect of this specification, after the user complete the payment, the settlement file may be generated on the terminal. The settlement file includes a user ID, a settlement amount, order details, a credit score corresponding to the user ID, and the like. The credit score is used for representing a credit rating of the user. Generally, a higher credit score of a user account indicates better credit of the user, and a probability of default and fraud of the user is lower.

When the user needs to leave the store after the settlement is completed, the user may approach the terminal to the NFC receiver at an exit of the store, and the foregoing settlement file may be transmitted to the NFC receiver through NFC communication.

The NFC receiver receives the settlement file of the user, and transmits the settlement file to the cloud server through a wireless or wired network. In this context, the NFC receiver may also be referred to as an NFC transceiver.

The cloud server compares the credit score of the user with a threshold, and determines a checking policy according to a comparison result.

If the credit score of the user is higher than a threshold, the cloud server may send a release control signal to a merchant server, to instruct to release the user. The merchant server may instruct to open a gate at the exit, and the user can leave the store directly.

If the credit score of the user is lower than the threshold, the cloud server may send a manual check control signal to the merchant server. Without opening the gate first, the merchant server sends a signal to a checkout station to instruct a cashier to check an order. Only if the order is correct, the gate is opened and the user can leave.

Further, in a case that the credit score of the user is higher than a threshold, the cloud server may update a database thereof by using the information in the settlement file received from the NFC receiver. The cloud server may increase the credit score of the user to obtain an updated credit score and update the credit score in a memory of the cloud server.

In another embodiment, the cloud server stores the credit score of the user. In this case, the NFC receiver may transmit only a user ID to the cloud server, and the cloud server queries the database thereof for a credit score of the user according to the user ID and increases and updates the credit score accordingly. In this case, the user does not need to provide a credit score of the user.

Further, the cloud server may send the user ID and the updated credit score and/or an increased/decreased value (for example, +1) of the credit score to a merchant server. The merchant server may display the user ID of the user on a screen in the store and an increase/decrease in the credit score of the user ID. For example, the increased value of the credit score may be displayed in a form of a credit tree, and the user may be prompted to leave the store directly. In some embodiments, the updated credit score and/or the increase/decrease value may be displayed on the user's terminal device.

Figure 17:
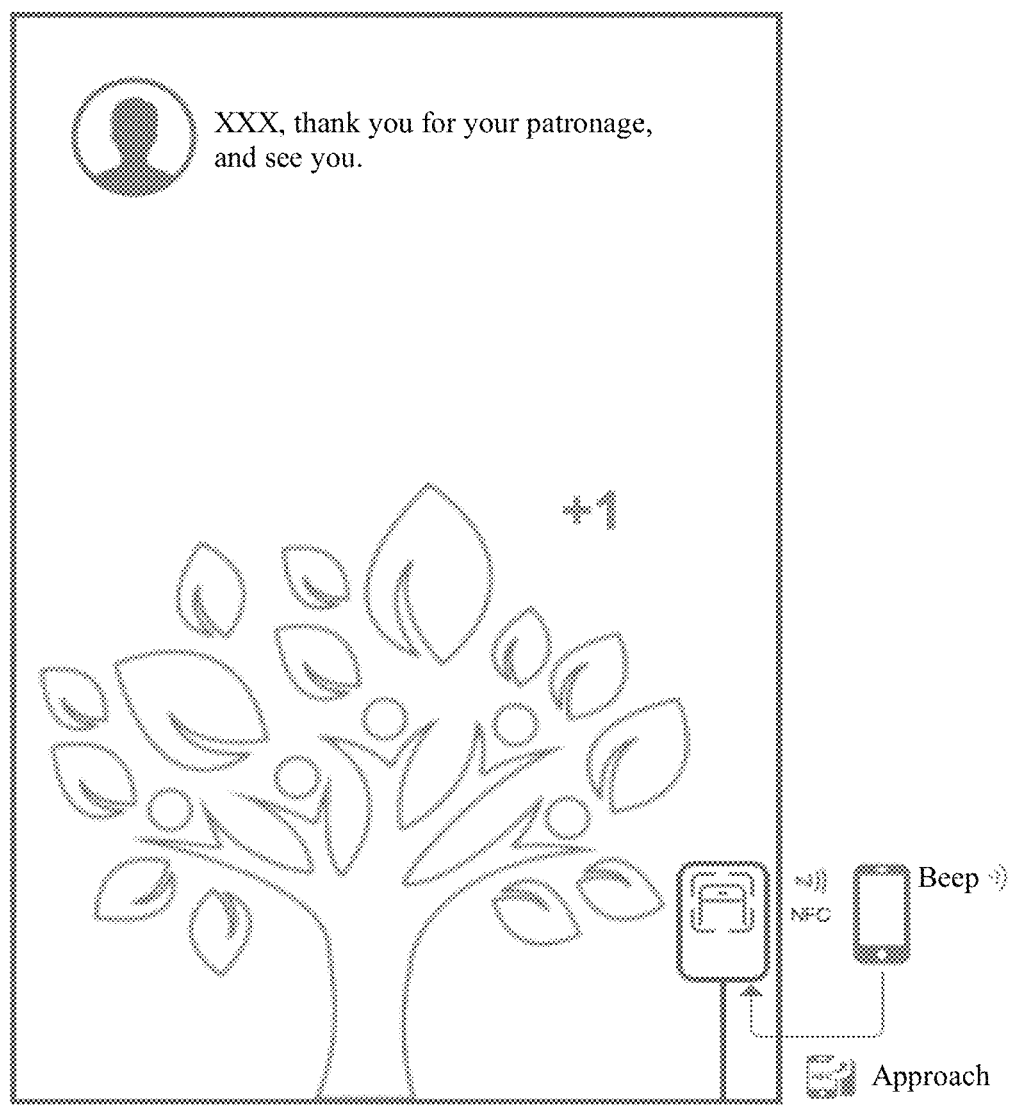
FIG. 17 shows a screen display of credit-based verification according to an aspect of this application.

In an example, the user ID may be displayed in a desensitized manner to protect user privacy, that is, to hide sensitive information of the user ID. For example, a portion of characters may be selected for * processing. For example, if a user ID is MissWang, the user ID may be desensitized and displayed as M******g. FIG. 17 shows the screen display.

The cloud server may further send the updated (increased) credit score of the user to an APP of the terminal (e.g., the client's smart phone) to update the client.

Figure 8:
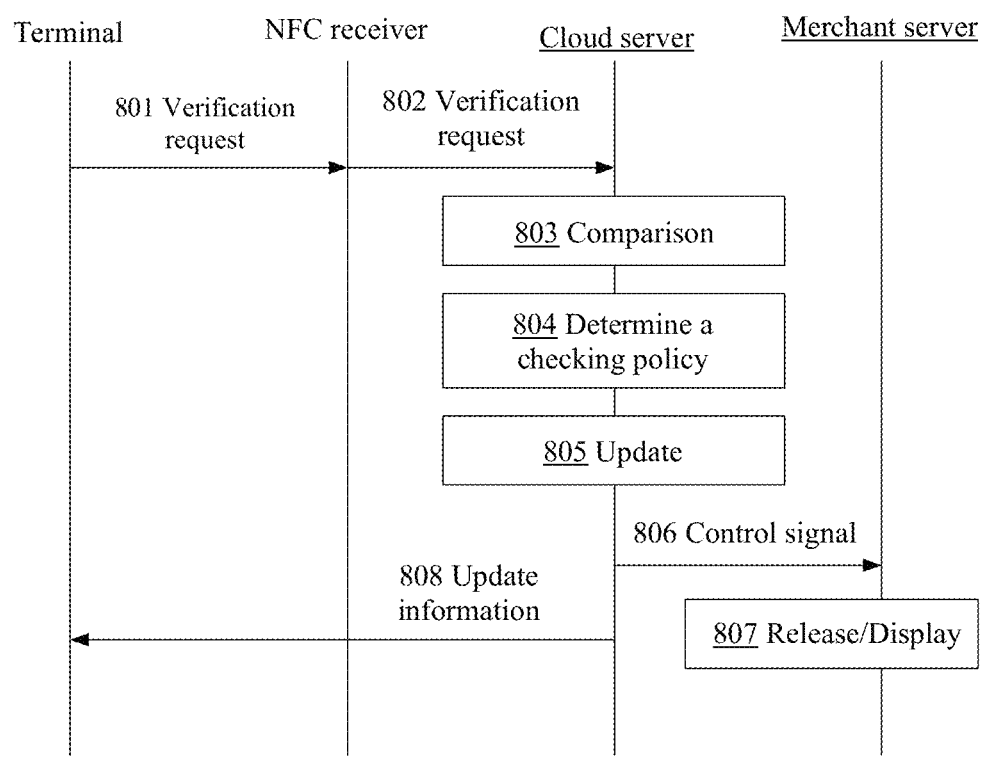
FIG. 8 is a message flow diagram of a credit-based verification method according to various aspects of this application.

FIG. 8 is a message flow diagram of a credit-based verification method according to various aspects of this specification.

As shown in FIG. 8, at step 801, after a user completes settlement by using a terminal such as a smartphone, the user approaches the terminal to an NFC receiver at an exit of a store, to send a verification request to the NFC receiver through NFC communication.

The verification request may include a settlement file of the user, including a user ID, a settlement amount, and order details. Optionally, the settlement file may further include a credit score of the user.

At step 802, the NFC receiver forwards the verification request to a cloud server.

At step 803, the cloud server compares the credit score of the user with a threshold.

In an example, the cloud server obtains the credit score of the user from the received settlement file. In another example, the settlement file may alternatively not include the credit score of the user. Instead, the cloud server searches a memory or a database thereof for a corresponding credit score by using the user ID in the settlement file.

At step 804, the cloud server determines a checking policy according to a comparison result at step 803.

If the credit score of the user is higher than the threshold, the cloud server determines that the checking policy is that the user leaves the store directly.

If the credit score of the user is lower than the threshold, the cloud server determines that the checking policy is that an order needs to be manually checked. Only if the order is correct, the user can leave.

In an example, the threshold of the credit score may be specified by a merchant.

At step 805, the cloud server updates data according to the received settlement information. For example, the credit score of the user may be increased after every certain number of verified transactions.

At step 806, the cloud server sends a control signal to the merchant server.

If the credit score of the user is higher than the threshold, the cloud server may send a release control signal to the merchant server, to instruct to release the user.

If the credit score of the user is lower than the threshold, the cloud server may send a manual check control signal to the merchant server.

At step 807, the merchant server may adopt different checking policies according to the received control signal.

For example, if the merchant server receives the release control signal, a gate at the exit may be instructed to open, and the user can leave the store directly.

Further, the merchant server may instruct to display the user ID of the user on a screen of the store and an increase in the credit score of the user ID. For example, an increased value of the credit score may be displayed in a form of a credit tree, and the user may be prompted to leave the store directly.

If the merchant server receives the manual check control signal, the merchant server instructs not to open the gate first, and the merchant server sends a signal to a checkout station to instruct a cashier to check an order. Only if the order is correct, the gate is opened and the user can leave.

At step 808, the cloud server may send the updated credit score of the user to an APP of the client's terminal device.

Although the steps are described above in a specific order, the order of the steps can also be changed. For example, step 806 may also be performed before step 805 or after step 808.

The foregoing describes an implementation of credit-based verification. However, other alternative implementations are also conceived of in this specification.

For example, in another implementation, the settlement information of the user may be transmitted to the receiver not through NFC communication. For example, a user terminal may generate a graphic code (for example, a two-dimensional barcode) after a payment, and settlement information, including a user ID of a user, a settlement amount, order details, and a credit score of the user ID, is embedded in the graphic code. At the exit of the store, the merchant reads the settlement information on the terminal through a scanning device, and then performs step 802 to step 808 in FIG. 8.

In another example, the credit score may alternatively be another value representing a performance capability of the user. For example, the credit score may be replaced with a quantity of points of the user in the merchant. In this case, an operation of the cloud server may be included in the merchant server. That is, the merchant server determines a checking policy according to whether the quantity of points of the user is higher than a threshold.

Compared with existing technologies, a credit-based verification solution provided by this specification has the following advantages:

1. In this solution, a user can complete a process from purchase to settlement in a self-service manner, which not only saves user's queuing time but also saves operations cost of the store. For example, only when the credit score is less than a preset value, the staff need to make a check, thereby saving labor costs for the merchant and improving work efficiency of the staff.

2. In a scenario in which a user completes shopping in a self-service manner, a credit-based verification mechanism is added, to reduce theft and loss to a specific extent.

3. An increase in a credit score is displayed to the user on a screen, and the user is prompted to leave the store directly, thereby improving user experience.

Personalized Association Recommendation

Another aspect of this specification provides a personalized association recommendation method.

At present, there are following solutions for product recommendation in physical stores:

I. Promotional recommendation is performed by using posters, or targeted recommendation is performed for members by using short messages or APPs. However, such recommendations cannot meet the real-time purchase requirements of a user.

II. With the population of terminals, locations of users can be learned of through a GPS function of the terminals, to recommend products to the user. However, because the GPS function may be unavailable indoors, and positioning accuracy is not high, product recommendation is not accurate enough.

In view of the foregoing problems, this specification provides a method for providing personalized association recommendations by using an electronic tag.

In this specification, a database related to electronic tags is established in a server, and a position of each electronic tag is stored in the database (for example, in a form of a map). In some embodiments, the user may use the terminal device to send a recommendation request including an electronic tag ID. When receiving a recommendation request, the server searches for the position of the electronic tag according to an electronic tag ID in the recommendation request, and determines whether there is a recommendable product near the electronic tag.

Figure 9:
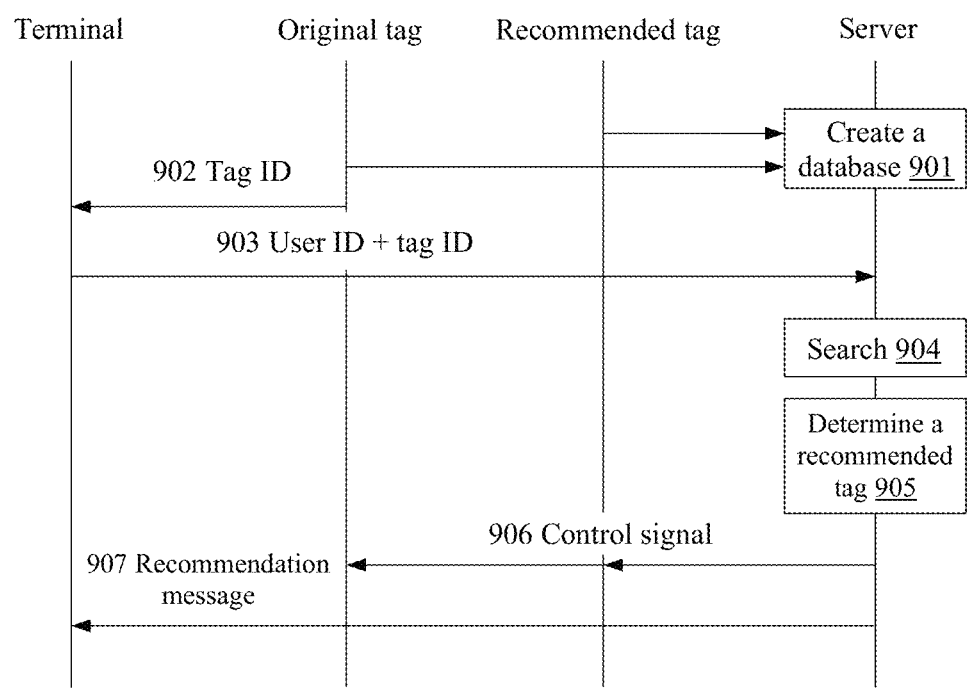
FIG. 9 shows a personalized association recommendation method according to an aspect of this application.

FIG. 9 shows a personalized association recommendation method according to an aspect of this specification.

At 901, a server creates an electronic tag database, where each entry of the electronic tag database includes an electronic tag ID, an electronic tag position, and an associated product ID.

Table 1 illustrates an example of the entry of the electronic tag database.

TABLE 1

| Tag ID 1 | Tag position 1 | Product ID 1 | . . . |
| Tag ID 2 | Tag position 2 | Product ID 2 | . . . |
| . . . | . . . | . . . | . . . |
| Tag ID N | Tag position N | Product ID N | . . . |

When the electronic tag is initially placed on a shelf or information in the electronic tag is updated, the electronic tag ID, the electronic tag position, and the associated product ID may be written into the electronic tag (referred to as original electronic tag in this specification). Then, the electronic tag may transmit a tag update message to the server, where the tag update message includes the electronic tag ID, the electronic tag position, and the associated product ID.

The server stores the electronic tag ID, the electronic tag position, and the associated product ID that are received into a database or updates information of the corresponding entry of the electronic tag in the database.

In an alternative implementation, the tag position and the associated product ID may alternatively be inputted into the server when the staff place the electronic tag, or a positioning module may be disposed in the electronic tag, and the positioning module determines a position of the electronic tag and sends the position to the server.

At step 902, a user terminal approaches the electronic tag, and reads the electronic tag ID and other information (for example, product information and store information) through NFC communication.

For example, when the terminal approaches the electronic tag, and a product A is added to a virtual shopping cart, the electronic tag may transmit the electronic tag ID to the terminal.

At step 903, in response to receiving the electronic tag ID, the terminal may automatically transmit a recommendation request to the server. The recommendation request may include the user ID and the electronic tag ID stored on the terminal.

At step 904, the server uses the electronic tag ID in the received recommendation request to search the database, to determine an electronic tag position and the corresponding product ID.

The server may search the database for the corresponding electronic tag position and the associated product ID by using the electronic tag ID.

At step 905, the server may recommend a product in a preset range of the electronic tag according to the electronic tag position, the associated product ID, and/or the user ID.

The preset range of the electronic tag may be a range within a threshold distance of the electronic tag, for example, a visible or audible range of the user.

The server may further include a discount database, which stores discount information of products. For example, purchasing a combined set of a product A and a product B may enjoy a price discount. In this way, if the user wants to purchase the product A, the server may recommend the combined set of the product A and the product B within a preset range of the electronic tag of the product A to the user.

The server may further include a user database storing information such as purchase history of users and user preferences.

For example, if a user often purchases a hair conditioner when purchasing a shampoo, when the server receives a recommendation request from a tag corresponding to a shampoo, the server searches a preset range of the tag to determine whether there is an electronic tag corresponding to a hair conditioner. In another example, if the user prefers to purchase a product of a brand A in the past, when the server receives a recommendation request from a tag corresponding to the product of a brand B, the server searches a preset range of the tag to determine whether there is an electronic tag corresponding to a product of the brand A.

The server may determine, according to information stored in the discount database and/or the user database by using a recommendation algorithm, whether there is a recommendable product in a preset range of an electronic tag, and determines an electronic tag ID (which may be referred to as recommended electronic tag in this specification) of a recommended product.

At step 906, the server may send a recommendation control signal to an original tag and a recommended tag.

In an example, in step 906, the server may locate the recommended electronic tag by using the electronic tag ID of the recommended product, and transmit the recommendation control signal to both the original electronic tag and the recommended electronic tag, for both to issue prompt signals together. For example, two tags flash at the same time or emit a prompt tone, to prompt the user to search for the recommended electronic tag.

Alternatively, at step 907, the server may send a recommendation message to the terminal, where the recommendation message includes position information of the recommended electronic tag. For example, the recommendation message may include an electronic tag map in the store, and positions of the original electronic tag and the recommended electronic tag are marked on the map, to prompt the user to search for the recommended electronic tag.

Figure 10:
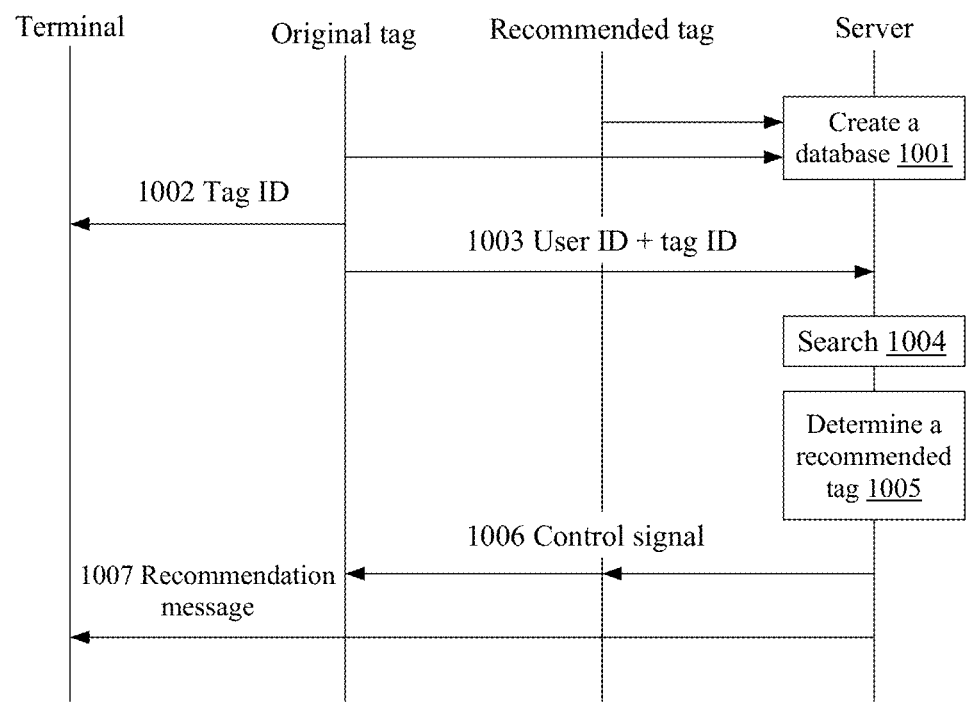
FIG. 10 shows a personalized association recommendation method according to another aspect of this application.

FIG. 10 shows a personalized association recommendation method according to another aspect of this specification. In this example, the terminal may transmit the user ID to the electronic tag when approaching the electronic tag to add the product to a shopping cart. The electronic tag sends the user ID and tag ID to the server for subsequent processing. Steps 1001 and 1004 to 1007 in an example in FIG. 10 are the same as steps 901 and 904-907 in FIG. 9, and details are not described herein again.

At step 1002, the terminal approaches the electronic tag, and transmits the user ID and other information (for example, the product information and the store information) to the electronic tag.

For example, when the terminal approaches the electronic tag, and adds the product A to the virtual shopping cart, the terminal may transmit the user ID to the electronic tag.

At step 1003, the electronic tag may transmit both the received user ID and the electronic tag ID stored on the electronic tag to the server.

Figure 11:
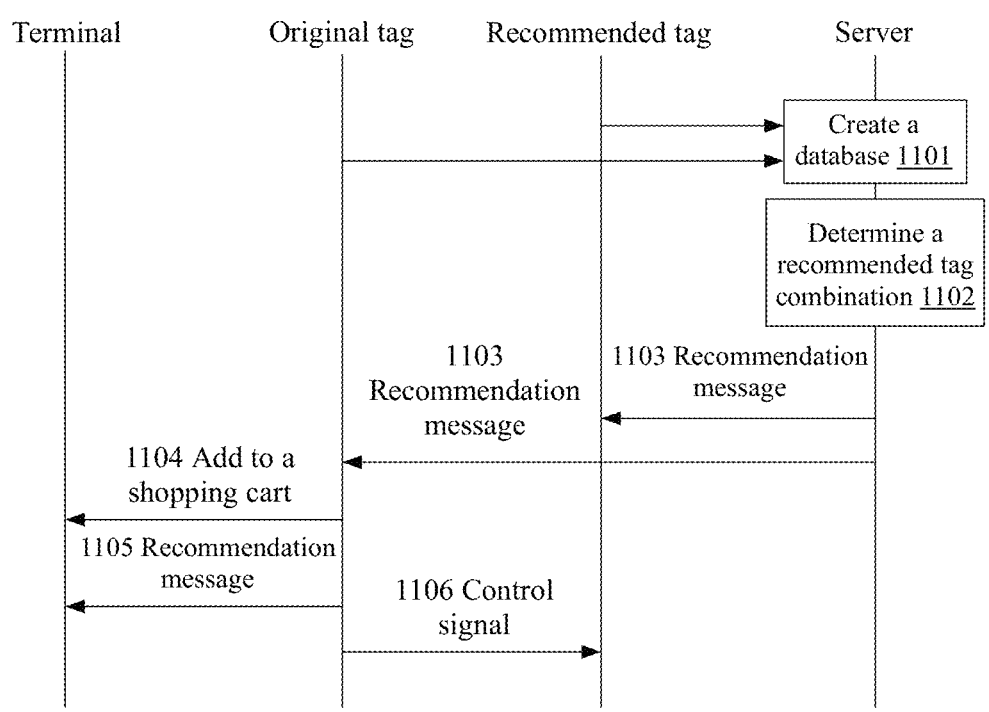
FIG. 11 shows a personalized association recommendation method according to still another aspect of this application.

FIG. 11 shows a personalized association recommendation method according to still another aspect of this specification.

In this method, the server determines a recommended electronic tag combination in advance. For example, when the electronic tag is disposed at a corresponding position or information in the electronic tag is updated, the server may determine a recommended electronic tag combination, and send, to each electronic tag in the recommended electronic tag combination, a recommended electronic tag associated thereto. In this implementation, user preferences are not considered in product recommendations. However, because a recommended combination is stored in the electronic tag in advance, product recommendation is faster.

At step 1101, the server creates an electronic tag database, where each entry of the electronic tag database includes an electronic tag ID, an electronic tag position, and an associated product ID. This step is similar to step 901, and details are not described herein again.

At step 1102, the server determines a recommended electronic tag combination.

For example, each time the server receives a tag update message from the electronic tag (also referred to as original electronic tag in this specification), the server may search products associated with the electronic tag to determine whether there is a recommendable product, for example, determine whether there is a tag of a recommendable product (for example, a discount package) associated with the product in the preset range of the electronic tag. As described in the description of step 905, details are not described herein again.

If one or more recommended products are found, the original electronic tag and an electronic tag (recommended electronic tag) or electronic tags corresponding to the one or more recommended products are formed into a recommended tag combination. For example, the server may store a mapping or mappings between an original electronic tag ID and one or more recommended electronic tag IDs.

At step 1103, the server transmits the recommendation message to each tag in the tag combination formed at step 1102, where the recommendation message includes tag information of another tag in the tag combination. For example, tag information of the recommended electronic tag is transmitted to the original electronic tag as a recommended tag, and tag information of the original electronic tag is transmitted to the recommended electronic tag as a recommended tag.

The tag information may include a tag ID, position information, and the like of an electronic tag.

After receiving recommended tag information, each electronic tag may store the information in a memory.

At step 1104, the terminal approaches the electronic tag, to add the corresponding product in a virtual shopping cart.

At step 1105, the electronic tag may transmit a recommendation message to the terminal in response to the approaching of the terminal, where the recommendation message may include the tag information of the associated electronic tag of the recommended product.

For example, the recommendation message may include an electronic tag map in the store, and positions of the original electronic tag and the recommended electronic tag are marked on the map, to prompt the user to search for the recommended electronic tag.

Alternatively, at step 1106, the electronic tag may transmit a control signal to the recommended electronic tag in response to the approaching of the terminal. For example, the electronic tag may address the recommended electronic tag by using the recommended electronic tag ID, and transmit the control signal to the recommended electronic tag, to enable the electronic tag to issue a prompt signal. For example, the recommended electronic tag flashes at the same time or emits a prompt tone, to prompt the user to find the recommended electronic tag.

Figure 12:
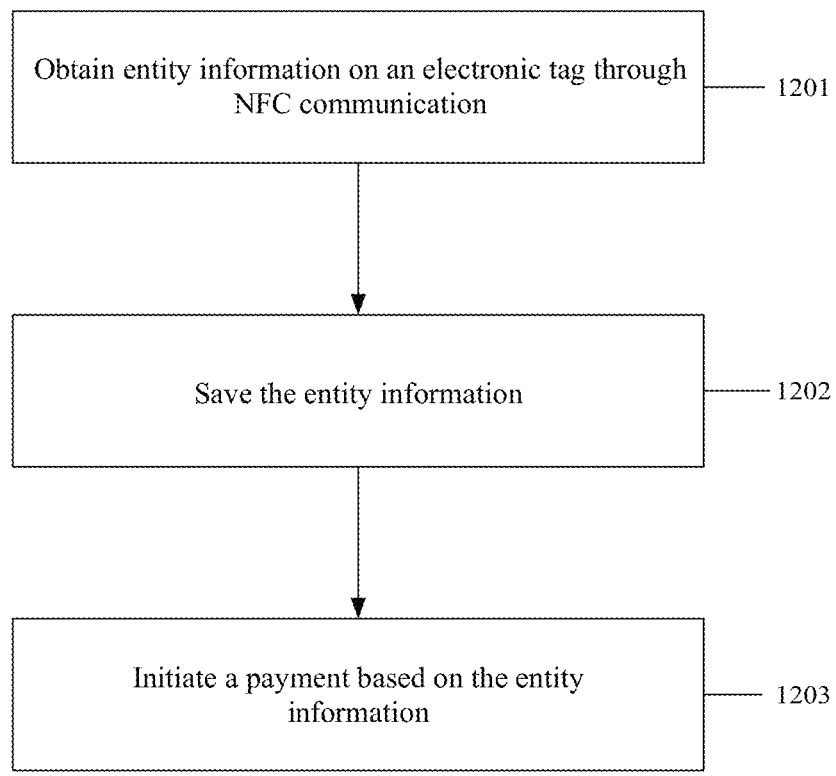
FIG. 12 is a flowchart of a method for self-service order generation according to various aspects of this application.

FIG. 12 is a flowchart of a method for self-service order generation according to various aspects of this specification.

As shown in FIG. 12, the method is performed by a user terminal and includes the following steps.

Step 1201: Obtaining entity information on an electronic tag through NFC communication. The entity information may include product information, for example, a product ID, a product price, and a store ID.

Step 1202: Saving the entity information.

Step 1203: Initiating a payment based on the entity information.

In some embodiments, the method further includes: sending a query message to a server, where the query message includes a product ID, the store ID, and a quantity of needed products. The terminal may receive a prompt signal together with the entity information. The prompt signal may be an audio signal or a vibration signal.

Figure 13:
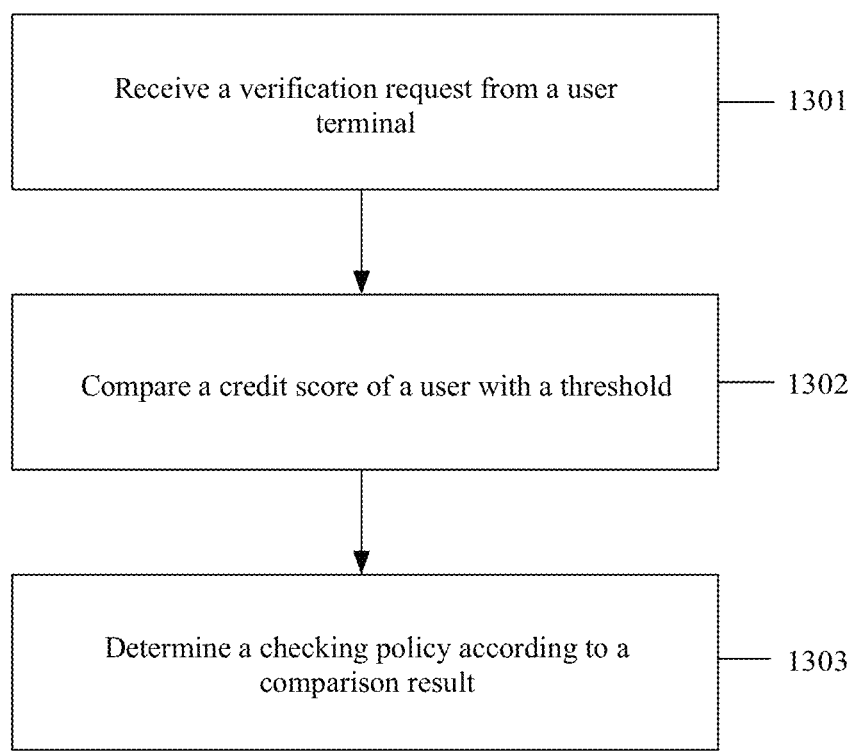
FIG. 13 is a flowchart of a credit-based checking method according to various aspects of this application.

FIG. 13 is a flowchart of a credit-based checking method according to various aspects of this specification.

As shown in FIG. 13, the method may be performed by a server and includes the following steps.

Step 1301: Receiving a verification request from a user terminal. The verification request may include a user ID. In an example, the verification request may be received through a near field communication (NFC) receiver. The NFC receiver performs NFC communication with the user terminal to obtain the verification request. In another example, the verification request is received through a code scanner. The code scanner obtains the verification request by scanning a two-dimensional barcode on the user terminal. In a further example, the verification request further includes a credit score of a user.

Step 1302: Comparing a credit score of a user with a threshold. In some embodiments, the method further includes: searching for the credit score of the user according to the user ID.

Step 1303: Determining a checking policy according to a comparison result. If the credit score of the user is higher than the threshold, the server may determine that the checking policy is directly releasing the user. If the credit score of the user is lower than the threshold, the server may determine that the checking policy is making a manual check. Further, if the credit score of the user is higher than the threshold, the server may increase the credit score of the user, and display, on a display, information indicating that the user can pass directly.

Figure 14:
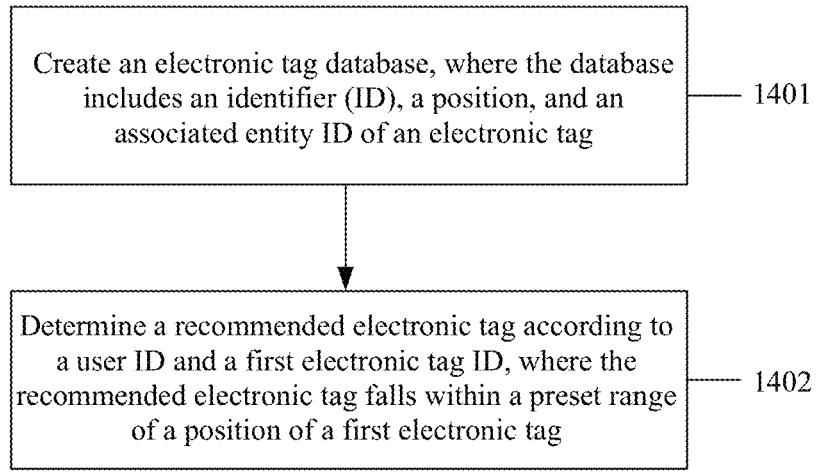
FIG. 14 shows a personalized association recommendation method performed by a server according to various aspects of this application.

FIG. 14 shows a personalized association recommendation method performed by a server according to various aspects of this specification.

As shown in FIG. 14, the method includes the following steps.

Step 1401: Creating an electronic tag database, where the database includes an identifier (ID), a position, and an associated entity ID of an electronic tag.

Step 1402: Determining a recommended electronic tag according to a user ID and a first electronic tag ID, where the recommended electronic tag falls within a preset range of a position of a first electronic tag.

According to an aspect, the method may further include: receiving the user ID and the first electronic tag ID. A server may send a recommendation message to a user terminal. The recommendation message includes position information of a recommended electronic tag. The recommendation message may enable the user terminal to display the position information of the recommended electronic tag in a form of a map. The server may further send a recommendation control signal to the first electronic tag and the recommended electronic tag, to enable the first electronic tag and the recommended electronic tag to issue prompt signal. According to an aspect, the user ID and the first electronic tag ID may be received from the first electronic tag, and the first electronic tag obtains the user ID from the user terminal through NFC communication. According to another aspect, the user ID and the first electronic tag ID may be received from the user terminal, and the user terminal obtains the first electronic tag ID from the first electronic tag through NFC communication. Further, the recommended electronic tag may be determined according to user characteristics, discount information, and a distance between the recommended electronic tag and the first electronic tag. The user characteristics include purchase history of the user and/or user preferences.

According to another aspect, the server sends the recommendation message to the first electronic tag and the recommended electronic tag.

Figure 15:
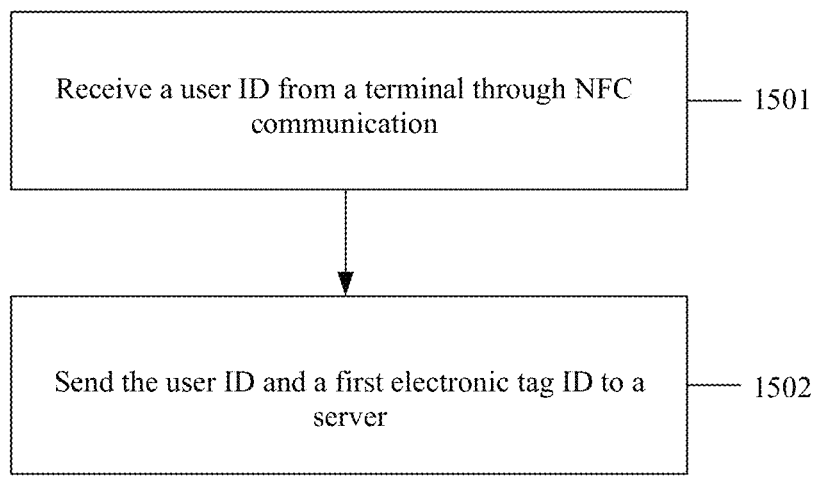
FIG. 15 shows a personalized association recommendation method performed by a first electronic tag according to various aspects of this application.

FIG. 15 shows a personalized association recommendation method performed by a first electronic tag according to various aspects of this specification.

As shown in FIG. 15, the method includes the following steps.

Step 1501: Receiving a user ID from a terminal through NFC communication at a first electronic tag.

Step 1502: Sending the user ID and an ID of the first electronic tag to the server.

The server determines a recommended electronic tag according to the user ID and the ID of the first electronic tag, where the recommended electronic tag falls within a preset range of a position of the first electronic tag.

According to an aspect, the first electronic tag may receive a recommendation control signal from the server, where the recommendation control signal enables the first electronic tag and the recommended electronic tag to issue prompt signals. The recommended electronic tag may be determined by the server according to user characteristics, discount information, and a distance between the recommended electronic tag and the first electronic tag. The user characteristics may include a purchase history of the user and/or user preferences.

Figure 16A:
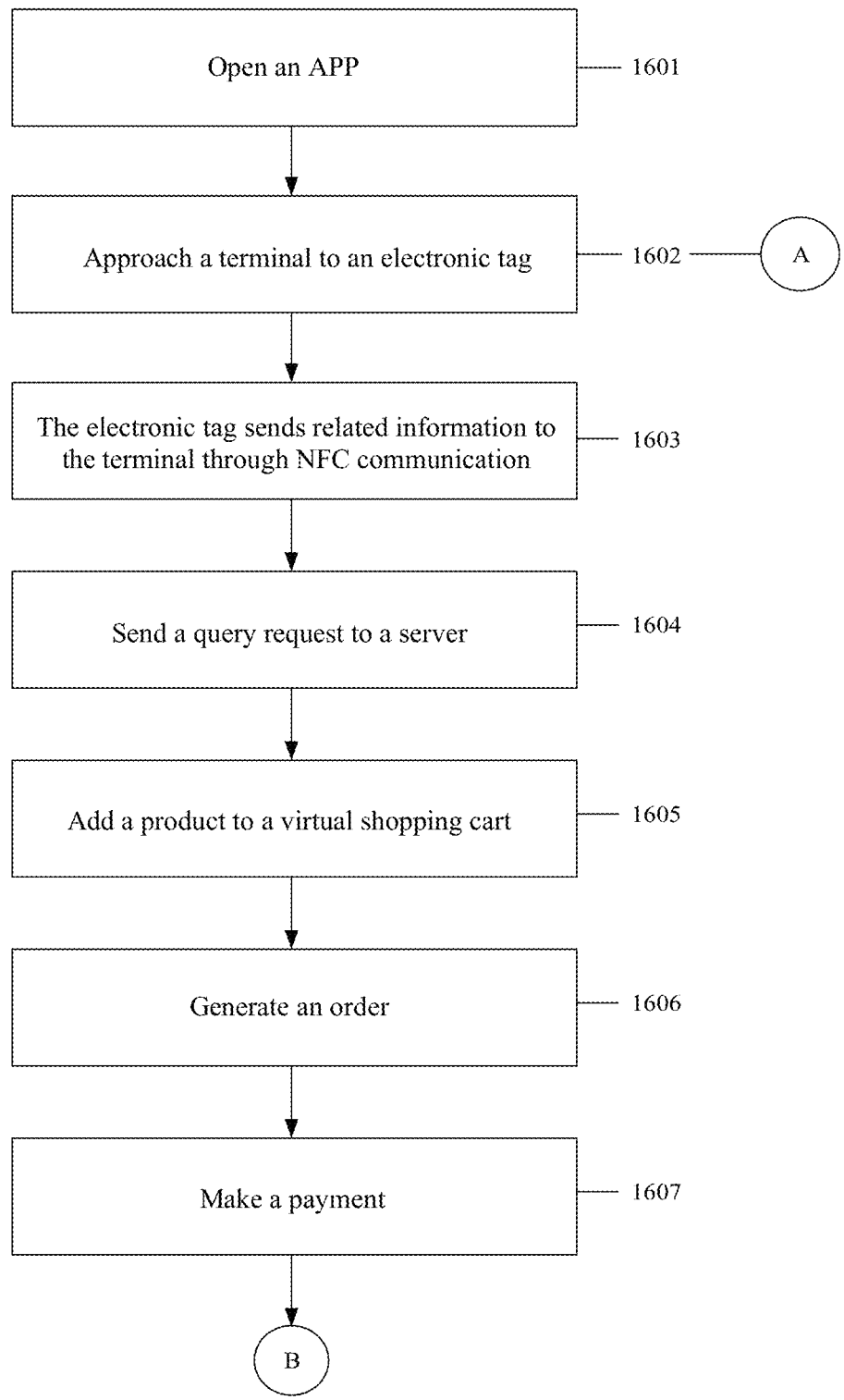
FIG. 16A to FIG. 16C are flowcharts of a method for offline shopping and personalized recommendation according to various aspects of this application.
Figure 16B:
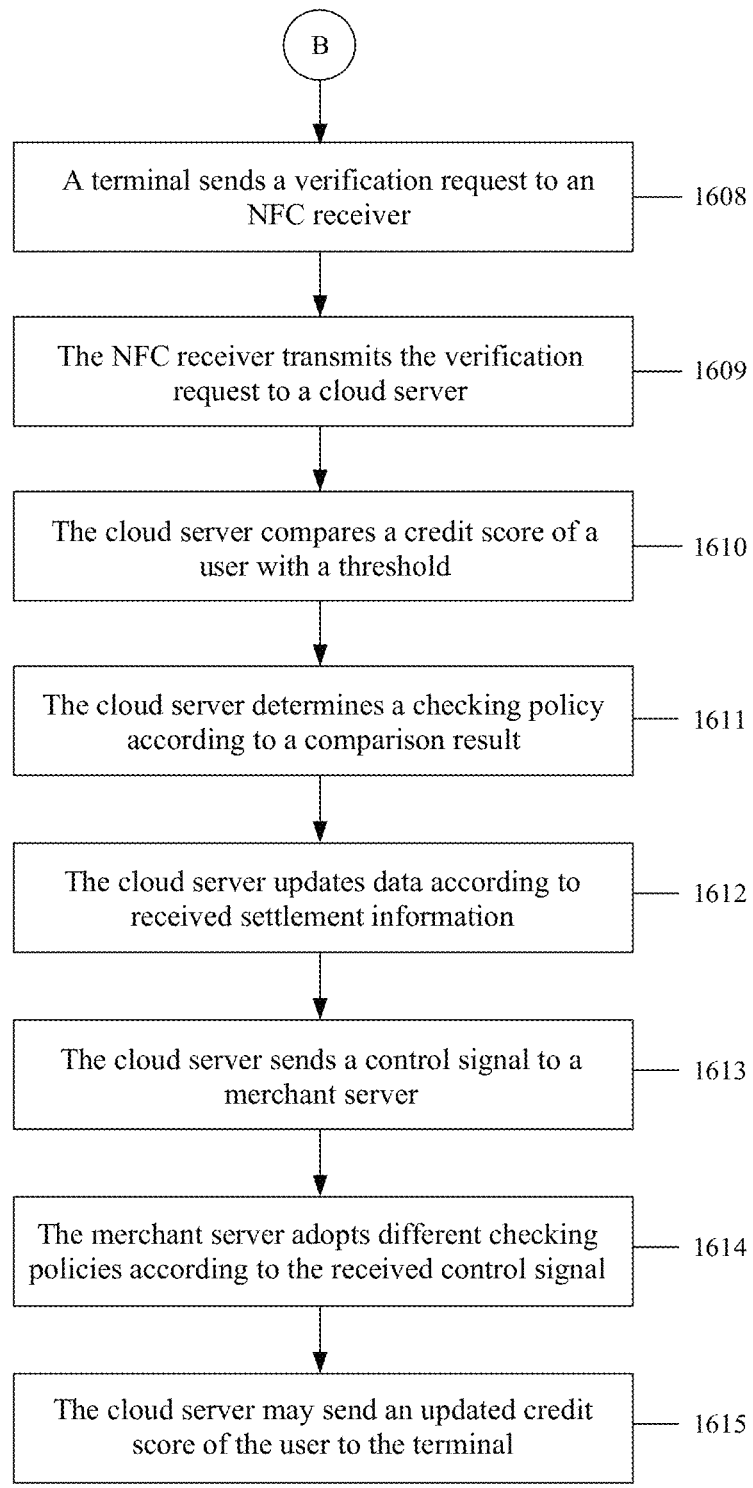
Figure 16C:
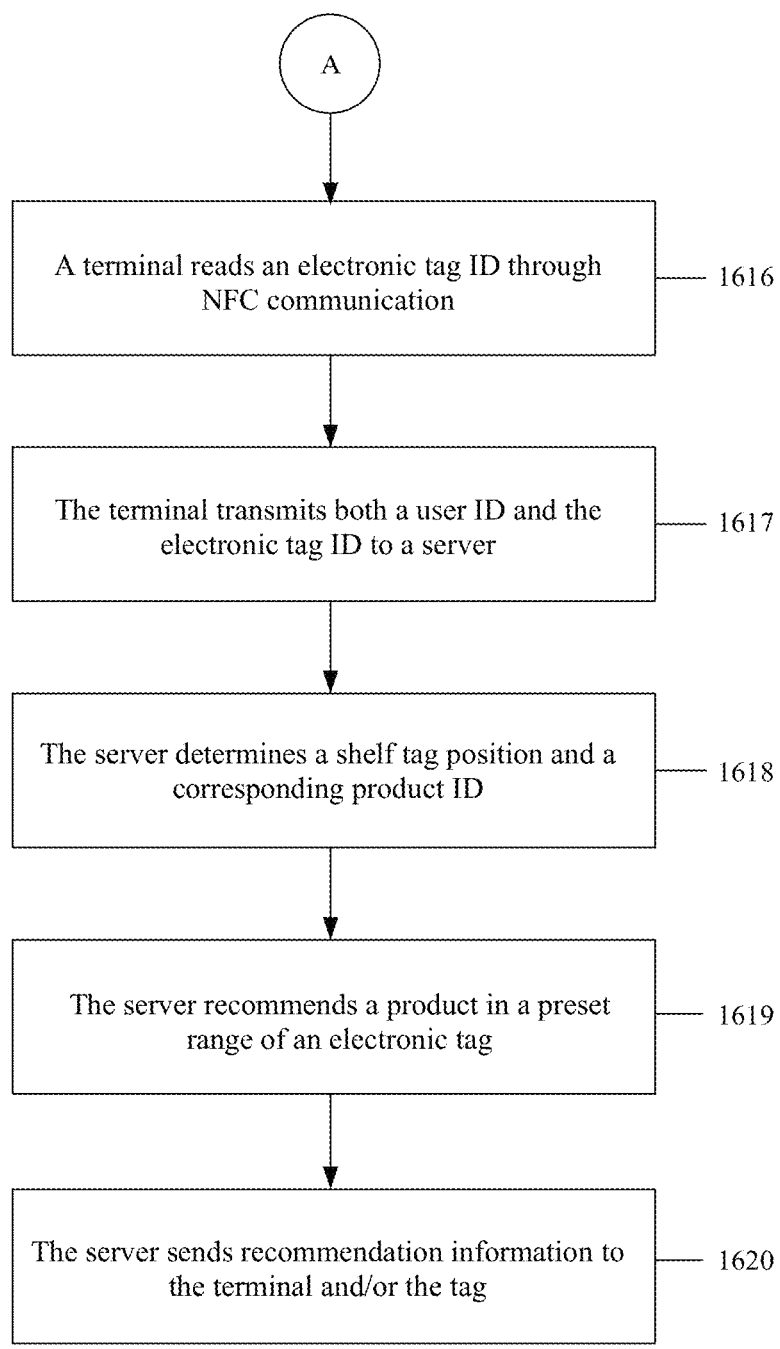

FIG. 16A to FIG. 16C are flowcharts of a method for offline shopping and personalized recommendation according to various aspects of this specification.

As shown in FIG. 16, at step 1601, a user enters a store, opens an application (APP) (e.g., the main APP) on a terminal, and enters an applet interface corresponding to the store. The applet may be entered by scanning a code or through a fixed entry in the main APP.

At step 1602, the user approaches the terminal to an electronic tag of a product of interest.

At step 1603, in response to the approaching of a terminal, an electronic tag sends related information (the store information, product information, and the like as described above) to the terminal through NFC communication. The electronic tag further sends a prompt signal to the terminal to prompt the user that the related information is successfully obtained/the product is successfully added to a shopping cart.

In some embodiments, at step 1604, the terminal may send a query request to the server (for example, a store server and a cloud server).

For example, when the user needs to purchase a large number of products or a product that the user wants to purchase is unavailable on the shelf, the user can send the store ID (for example, the store ID obtained from the electronic tag) and a product ID to the server by using the terminal, to query the server for whether the store has sufficient stock.

At step 1605, in response to receiving the information from the electronic tag, the terminal adds a corresponding product to a virtual shopping cart.

At step 1606, the terminal generates an order in the APP.

At step 1607, a payment is made on the terminal. A settlement file may be generated after the payment is completed, and the settlement file includes a user ID, a settlement amount, order details, a credit score of the user ID, and the like.

At step 1608, after the user completes the settlement, the terminal is approached to an NFC receiver at an exit of the store, and a verification request is sent to the NFC receiver through NFC communication.

At step 1609, the NFC receiver transmits the verification request to the cloud server.

At step 1610, the cloud server compares the credit score of the user with a threshold.

In an example, the cloud server obtains the credit score of the user from the received settlement file. In another example, if the settlement file does not include the credit score of the user, the cloud server may search a memory thereof for the corresponding credit score by using the user ID in the settlement file.

At step 1611, the cloud server determines a checking policy according to a comparison result at 1610.

If the credit score of the user is higher than the threshold, the cloud server determines that the checking policy is that the user leaves the store directly.

If the credit score of the user is lower than the threshold, the cloud server determines that the checking policy is that an order needs to be manually checked. Only if the order is correct, the user can leave.

In an example, the threshold of the credit score may be specified by a merchant.

At step 1612, the cloud server updates data according to received settlement information. For example, the credit score of the user may be increased.

At step 1613, the cloud server sends a control signal to the merchant server.

If the credit score of the user is higher than the threshold, the cloud server may send a release control signal to the merchant server, to instruct to release the user.

If the credit score of the user is lower than the threshold, the cloud server may send a manual check control signal to the merchant server.

At step 1614, the merchant server may adopt different checking policies according to the received control signal.

For example, if the merchant server receives the release control signal, a gate at the exit may be instructed to open, and the user can leave the store directly. Further, the merchant server may instruct to display the user ID of the user on a screen of the store and an increase in the credit score of the user ID. For example, an increased value of the credit score may be displayed in a form of a credit tree, and the user may be prompted to leave the store directly.

If the merchant server receives the manual check control signal, the merchant server instructs not to open the gate first, and the merchant server sends a signal to a checkout station to instruct a cashier to check an order. Only if the order is correct, the gate is opened and the user can leave.

At step 1615, the cloud server may send the updated credit score of the user to an APP of a terminal, for an update in a client.

In some embodiments, at step 1602, when the user approaches the terminal to the electronic tag of the product of interest, the following steps can also be performed:

At step 1616, the terminal reads the electronic tag ID through NFC communication.

For example, when the terminal approaches the electronic tag, and a product A is added to a virtual shopping cart, the electronic tag may transmit the electronic tag ID to the terminal.

At step 1617, in response to receiving the electronic tag ID, the terminal may transmit both the user ID and the electronic tag ID to the server.

At step 1618, the server uses a received shelf tag ID for searching, to determine a shelf tag position and a corresponding product ID.

The server may search the database for the corresponding electronic tag position and the associated product ID by using the electronic tag ID.

At step 1619, the server may recommend a product in a preset range of the electronic tag according to the electronic tag position, the associated product ID, and/or the user ID.

At step 1620, the server sends recommendation information to the terminal and/or the tag.

A person skilled in the art may understand that 1616 to 1620 may alternatively be replaced by steps 1002 to 1007 in FIG. 10 or steps 1102 to 1106 in FIG. 11.

After the server completes a recommendation operation, the procedure may return to step 1602 to continue the payment. For example, the terminal may approach the recommended electronic tag to add the corresponding product to the shopping cart.

The detailed description set forth above in connection with the appended drawings describes exemplary examples and does not represent the only examples that may be implemented or that are within the scope of the claims. The term "exemplary" when used in this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the specification herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the application and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. In addition, as used herein (including in the claims), "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Similarly, as used herein, the phrase "based on" shall not be construed as a reference to a closed set of conditions. For example, an exemplary step that is described as "based on condition A" may be based on both a condition A and a condition B without departing from the scope of the present specification. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies, such as infrared, radio, and microwave, are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description of this specification is provided to enable a person skilled in the art to make or use this specification. Various modifications to this specification will be readily apparent to a person skilled in the art, and the generic principles defined herein may be applied to other variations without departing from the spirit or scope of this specification. Therefore, this specification is not to be limited to the examples and designs described herein but is to be accorded the widest scope consistent with the principles and novel features disclosed herein.

What is claimed is:

1. A computer-implemented method for processing information, comprising:
    reading, by a user device through a near field communication (NFC) interface, an electronic tag to obtain product information stored in the electronic tag;
    storing, by the user device, the product information in the user device;
    generating, by the user device, an order based on the stored product information;
    receiving, by the user device, a settlement file after the order is paid, wherein the settlement file comprises a user identification (ID) and a user credit score corresponding to the user ID;
    transmitting, by the user device, the settlement file to a server for verification based on the user credit score;
    receiving, by the user device, a verification response from the server that comprises an updated user credit score; and
    storing, by the user device, the updated user credit score.

2. The method of claim 1, wherein the product information comprises a product ID and a product price.

3. The method of claim 1, wherein the product information comprises a store ID of a store and a product ID of a product, and the method further comprises:
    sending a query to the server, wherein the query comprises the store ID, the product ID, and a quantity of the product; and
    receiving a response from the server, wherein the response indicates whether the store has the quantity of the product in stock.

4. The method of claim 1, wherein the transmitting the settlement file to the server for verification comprises:
    transmitting the settlement file through the NFC interface to an NFC transceiver for the NFC transceiver to transmit the settlement file to the server.

5. The method of claim 1, wherein the transmitting the settlement file to the server for verification comprises:
    generating a QR code comprising information of the settlement file.

6. The method of claim 1, wherein the electronic tag further stores a tag ID corresponding to a location of the electronic tag in a store, and the method further comprises:
    sending, by the user device, a recommendation request comprising the user ID and the tag ID to the server; and
    receiving, by the user device, information of one or more recommended products that are within a distance from the location of the electronic tag in the store.

7. One or more non-transitory computer-readable storage media of a user device, storing instructions executable by one or more processors, wherein execution of the instructions causes the one or more processors to perform operations comprising:
    reading, through a near field communication (NFC) interface, an electronic tag to obtain product information stored in the electronic tag;
    storing the product information;
    generating an order based on the stored product information;
    receiving a settlement file after the order is paid, wherein the settlement file comprises a user identification (ID) and a user credit score corresponding to the user ID;
    transmitting the settlement file to a server for verification based on the user credit score;
    receiving a verification response from the server that comprises an updated user credit score; and
    storing the updated user credit score.

8. The non-transitory computer-readable storage media of claim 7, wherein the product information comprises a product ID and a product price.

9. The non-transitory computer-readable storage media of claim 7, wherein the product information comprises a store ID of a store and a product ID of a product, and the operations further comprise:
sending a query to the server, wherein the query comprises the store ID, the product ID, and a quantity of the product; and
receiving a response from the server, wherein the response indicates whether the store has the quantity of the product in stock.

10. The non-transitory computer-readable storage media of claim 7, wherein the transmitting the settlement file to the server for verification comprises:
transmitting the settlement file through the NFC interface to an NFC transceiver for the NFC transceiver to transmit the settlement file to the server.

11. The non-transitory computer-readable storage media of claim 7, wherein the transmitting the settlement file to the server for verification comprises:
generating a QR code comprising information of the settlement file.

12. The non-transitory computer-readable storage media of claim 7, wherein the electronic tag further stores a tag ID corresponding to a location of the electronic tag in a store, and the operations further comprise:
sending a recommendation request comprising the user ID and the tag ID to the server; and
receiving information of one or more recommended products that are within a distance from the location of the electronic tag in the store.

13. A system of a user device comprising one or more processors and one or more non-transitory computer-readable memories coupled to the one or more processors and configured with instructions executable by the one or more processors to cause the system to perform operations comprising:
reading, through a near field communication (NFC) interface, an electronic tag to obtain product information stored in the electronic tag;
storing the product information;
generating an order based on the stored product information;
receiving a settlement file after the order is paid, wherein the settlement file comprises a user identification (ID) and a user credit score corresponding to the user ID;
transmitting the settlement file to a server for verification based on the user credit score;
receiving a verification response from the server that comprises an updated user credit score; and
storing the updated user credit score.

14. The system of claim 13, wherein the product information comprises a product ID and a product price.

15. The system of claim 13, wherein the product information comprises a store ID of a store and a product ID of a product, and the operations further comprise:
sending a query to the server, wherein the query comprises the store ID, the product ID, and a quantity of the product; and
receiving a response from the server, wherein the response indicates whether the store has the quantity of the product in stock.

16. The system of claim 13, wherein the transmitting the settlement file to the server for verification comprises:
transmitting the settlement file through the NFC interface to an NFC transceiver for the NFC transceiver to transmit the settlement file to the server.

17. The system of claim 13, wherein the electronic tag further stores a tag ID corresponding to a location of the electronic tag in a store, and the operations further comprise:
sending a recommendation request comprising the user ID and the tag ID to the server; and
receiving information of one or more recommended products that are within a distance from the location of the electronic tag in the store.

* * * * *